United States Patent
Ohara

(10) Patent No.: US 10,931,632 B2
(45) Date of Patent: Feb. 23, 2021

(54) COMMUNICATION APPARATUS AND RECORDING MEDIUM

(71) Applicant: FUJI XEROX CO., LTD., Tokyo (JP)

(72) Inventor: Chie Ohara, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/597,132

(22) Filed: Oct. 9, 2019

(65) Prior Publication Data

US 2020/0045014 A1    Feb. 6, 2020

Related U.S. Application Data

(63) Continuation of application No. 15/792,002, filed on Oct. 24, 2017, now Pat. No. 10,476,842.

(30) Foreign Application Priority Data

Mar. 24, 2017    (JP) .................................. 2017-058826

(51) Int. Cl.
*H04L 29/12* (2006.01)
*H04N 1/00* (2006.01)
(Continued)

(52) U.S. Cl.
CPC ........ *H04L 61/3015* (2013.01); *G06F 3/1236* (2013.01); *G06F 3/1285* (2013.01);
(Continued)

(58) Field of Classification Search
CPC ........... H04N 1/00413; H04N 1/33376; H04N 1/00204; H04N 1/32096; H04N 1/00411; H04N 1/32502; H04N 1/3209; H04N 1/00244; H04N 1/33323; H04N 1/00482; H04N 2201/0027; H04N 2201/0039; H04N 2201/0012; H04N 1/324; H04N 1/32561; H04N 1/00464; H04L 61/3015;
(Continued)

(56) References Cited

U.S. PATENT DOCUMENTS 6,298,405 B1 * 10/2001 Ito .......................... G06F 3/1208
                                                      710/107
6,775,020 B2 * 8/2004 Fukunaga .............. G06F 3/1204
                                                      358/1.14

(Continued)

FOREIGN PATENT DOCUMENTS

CN     202085179 U  * 12/2011
JP     2007-006221 A   1/2007
(Continued)

OTHER PUBLICATIONS

Dec. 8, 2020 Office Action issued in Japanese Patent Application No. 2017-058826.

*Primary Examiner* — Kostas J Katsikis
(74) *Attorney, Agent, or Firm* — Oliff PLC

(57) ABSTRACT

A communication apparatus includes: a transmitting unit that is capable of transmitting data to a designated destination through any of plural communication interfaces; a storage unit in which plural pieces of destination information are stored; and a registration unit that registers a communication interface used for data transmission in advance for each of the plural pieces of destination information stored in the storage unit.

3 Claims, 14 Drawing Sheets

(51) Int. Cl.
*H04N 1/333* (2006.01)
*H04N 1/32* (2006.01)
*G06F 3/12* (2006.01)

(52) U.S. Cl.
CPC ..... *H04L 61/2007* (2013.01); *H04N 1/00204* (2013.01); *H04N 1/00244* (2013.01); *H04N 1/00411* (2013.01); *H04N 1/00413* (2013.01); *H04N 1/00482* (2013.01); *H04N 1/3209* (2013.01); *H04N 1/32096* (2013.01); *H04N 1/32502* (2013.01); *H04N 1/33323* (2013.01); *H04N 1/33376* (2013.01); *H04L 61/2076* (2013.01); *H04N 2201/0012* (2013.01); *H04N 2201/0027* (2013.01); *H04N 2201/0039* (2013.01)

(58) Field of Classification Search
CPC ............. H04L 61/2007; H04L 61/2076; G06F 3/1285; G06F 3/1236
See application file for complete search history.

(56) References Cited

U.S. PATENT DOCUMENTS

| | | | |
|---|---|---|---|
| 7,765,285 B2 | 7/2010 | Yoshida et al. | |
| 9,001,370 B1 | 4/2015 | Nuggehalli | |
| 9,665,810 B2 | 5/2017 | Oshima | |
| 2001/0012118 A1* | 8/2001 | Fukunaga | G06F 3/1226 358/1.14 |
| 2006/0197979 A1* | 9/2006 | Kawasaki | H04N 1/2166 358/1.15 |
| 2007/0064683 A1 | 3/2007 | Furukawa | |
| 2007/0143464 A1* | 6/2007 | Ooba | H04L 61/2038 709/223 |
| 2009/0257078 A1 | 10/2009 | Sawada et al. | |
| 2009/0285221 A1* | 11/2009 | Ito | H04L 41/0833 370/395.53 |
| 2010/0299307 A1* | 11/2010 | Kusumoto | G06F 16/116 707/609 |
| 2011/0080910 A1 | 4/2011 | Shouno | |
| 2011/0208881 A1 | 8/2011 | Abe | |
| 2012/0069369 A1* | 3/2012 | Hagiwara | H04N 1/00278 358/1.13 |
| 2013/0073107 A1* | 3/2013 | Sawada | G06F 1/263 700/297 |
| 2013/0088749 A1* | 4/2013 | Park | G06F 1/3284 358/1.15 |
| 2013/0286434 A1* | 10/2013 | Okazawa | H04N 1/00129 358/1.15 |
| 2013/0308642 A1* | 11/2013 | Kimura | G06F 1/3278 370/392 |
| 2014/0085677 A1* | 3/2014 | Saito | H04N 1/00129 358/1.15 |
| 2014/0287690 A1 | 9/2014 | Kim | |
| 2015/0089033 A1* | 3/2015 | Nakahara | H04L 67/28 709/222 |
| 2015/0220286 A1 | 8/2015 | Shibata | |
| 2016/0204947 A1 | 7/2016 | Uchikawa | |
| 2016/0291851 A1 | 10/2016 | Tomono | |
| 2016/0359982 A1* | 12/2016 | Shih | H04L 49/55 |
| 2017/0262041 A1* | 9/2017 | Takiguchi | G03G 15/5004 |
| 2017/0310849 A1 | 10/2017 | Hosoda et al. | |
| 2019/0095150 A1* | 3/2019 | Sugimoto | B41J 29/38 |
| 2020/0100001 A1* | 3/2020 | Tanaka | H04Q 9/02 |

FOREIGN PATENT DOCUMENTS

| | | | |
|---|---|---|---|
| JP | 2007-116268 A | | 5/2007 |
| JP | 2007295409 A | * | 11/2007 |
| JP | 2007-328411 A | | 12/2007 |
| JP | 2008-130089 A | | 6/2008 |
| JP | 4849962 B2 | | 1/2012 |
| JP | 2014-220607 A | | 11/2014 |
| JP | 2016-025642 A | | 2/2016 |
| JP | 2016-066853 A | | 4/2016 |
| KR | 2008-0095745 A | | 10/2008 |
| KR | 2013-0022412 A | | 3/2013 |
| KR | 101502906 B1 | | 3/2015 |

* cited by examiner

FIG. 4

| USER NAME | DESTINATION 1 | | DESTINATION 2 | | DESTINATION 3 | |
|---|---|---|---|---|---|---|
| | E-MAIL ADDRESS | REGISTERED IF | SHARED FOLDER | REGISTERED IF | FTP SERVER | REGISTERED IF |
| AAA | aaa@cmail.com | | \\192.168.1.10\share | COMMUNICATION IF 1 | | |
| BBB | bbb@fffff.co.jp | COMMUNICATION IF 2 | | | ftp://192.168.20.5/root/ | COMMUNICATION IF 1 |
| CCC | | | \\testserver.local\doc | COMMUNICATION IF 2 | | |
| ... | | | | | | |
| ZZZ | zzz@ggggg.co.jp | | | | ftp://192.168.20.20/home/zzz/ | COMMUNICATION IF 1 |

FIG. 7

| USER NAME | DESTINATION 1 | | DESTINATION 2 | | | DESTINATION 3 | |
|---|---|---|---|---|---|---|---|
| | E-MAIL ADDRESS | REGISTERED IF | SHARED FOLDER | REGISTERED IF | | FTP SERVER | REGISTERED IF |
| AAA | aaa@cmail.com | | ¥¥192.168.1.10¥share | COMMUNICATION IF 1 | | ftp://192.168.20.20/home/aaa/ | COMMUNICATION IF 1 |
| BBB | bbb@ffffff.co.jp | COMMUNICATION IF 2 | | | | ftp://192.168.20.5/root/ | COMMUNICATION IF 1 |
| CCC | ccc@abcdefg.co.jp | | ¥¥testserver.local¥doc | COMMUNICATION IF 2 | | | |
| ... | | | ... | | | ... | |
| ZZZ | zzz@ggggg.co.jp | | | | | ftp://192.168.20.20/home/zzz/ | COMMUNICATION IF 1 |

DETERMINE THAT "COMMUNICATION IF 1" IS TO BE USED BECAUSE IP ADDRESS IS SAME

FIG. 14

| USER NAME | DESTINATION 1 | | DESTINATION 2 | | | DESTINATION 3 | | |
|---|---|---|---|---|---|---|---|---|
| | E-MAIL ADDRESS | REGISTERED IF | SHARED FOLDER | REGISTERED IF | | FTP SERVER | REGISTERED IF | |
| AAA | aaa@cmail.com | | \\192.168.1.10\share | COMMUNICATION IF 1 | | ftp://192.168.20.20/home/aaa/ | COMMUNICATION IF 1 | |
| BBB | bbb@ffffff.co.jp | COMMUNICATION IF 2 | | | | ftp://192.168.20.5/root/ | COMMUNICATION IF 1 | |
| CCC | ccc@abcdefg.co.jp | COMMUNICATION IF 2 | \\testserver.local\doc | COMMUNICATION IF 2 | | | | |
| ... | | | | | | | | |

DETERMINE THAT "COMMUNICATION IF 2" IS TO BE USED BECAUSE "COMMUNICATION IF 2" IS REGISTERED IN ANOTHER DESTINATION OF SAME USER

COMMUNICATION APPARATUS AND RECORDING MEDIUM

CROSS-REFERENCE TO RELATED APPLICATIONS

This application is continuation of U.S. application Ser. No. 15/792,002 filed Oct. 24, 2017, which is based on and claims priority under 35 USC 119 from Japanese Patent Application No. 2017-058826 filed Mar. 24, 2017. The contents of the above applications are incorporated herein by reference.

BACKGROUND

(i) Technical Field

The present invention relates to a communication apparatus and a recording medium.

(ii) Related Art

In recent years, plural networks that provide restricted access according to a user or usage are constructed at the same place or the same office. Examples are a corporate network and a visitor network at a company, an employee network and a customer network at a shop or the like, and a teacher network and a student network at a school or the like.

In a case where such networks are constructed, plural communication interfaces are connected to the different networks by using a multi-interface device having plural communication interfaces.

For example, in some cases, a multi-function printer having plural functions such as a printing function, a copying function, and a facsimile function is configured to have plural communication interfaces, and the communication interfaces are connected to different networks.

In such a case, in a case where image data read by a scanner is transferred to a designated destination, it is necessary to perform connection confirmation processing while switching the communication networks, select a communication network that can be connected to the designated destination from among the plural communication networks, and then transfer the scanned image data to the selected communication network.

SUMMARY

According to an aspect of the invention, there is provided a communication apparatus including: a transmitting unit that is capable of transmitting data to a designated destination through any of plural communication interfaces; a storage unit in which plural pieces of destination information are stored; and a registration unit that registers a communication interface used for data transmission in advance for each of the plural pieces of destination information stored in the storage unit.

BRIEF DESCRIPTION OF THE DRAWINGS

An exemplary embodiment of the present invention will be described in detail based on the following figures, wherein:

FIG. 4 is a diagram for explaining an example of an address book stored in an address book storage unit;

FIG. 7 illustrates an example of the address book to which a new destination has been added;

FIG. 14 illustrates an example of an address book for explaining an example of a determining process using another destination for which a communication IF has been registered and the same user has been registered.

DETAILED DESCRIPTION

Next, an exemplary embodiment of the present invention is described in detail with reference to the drawings.

Figure 1:
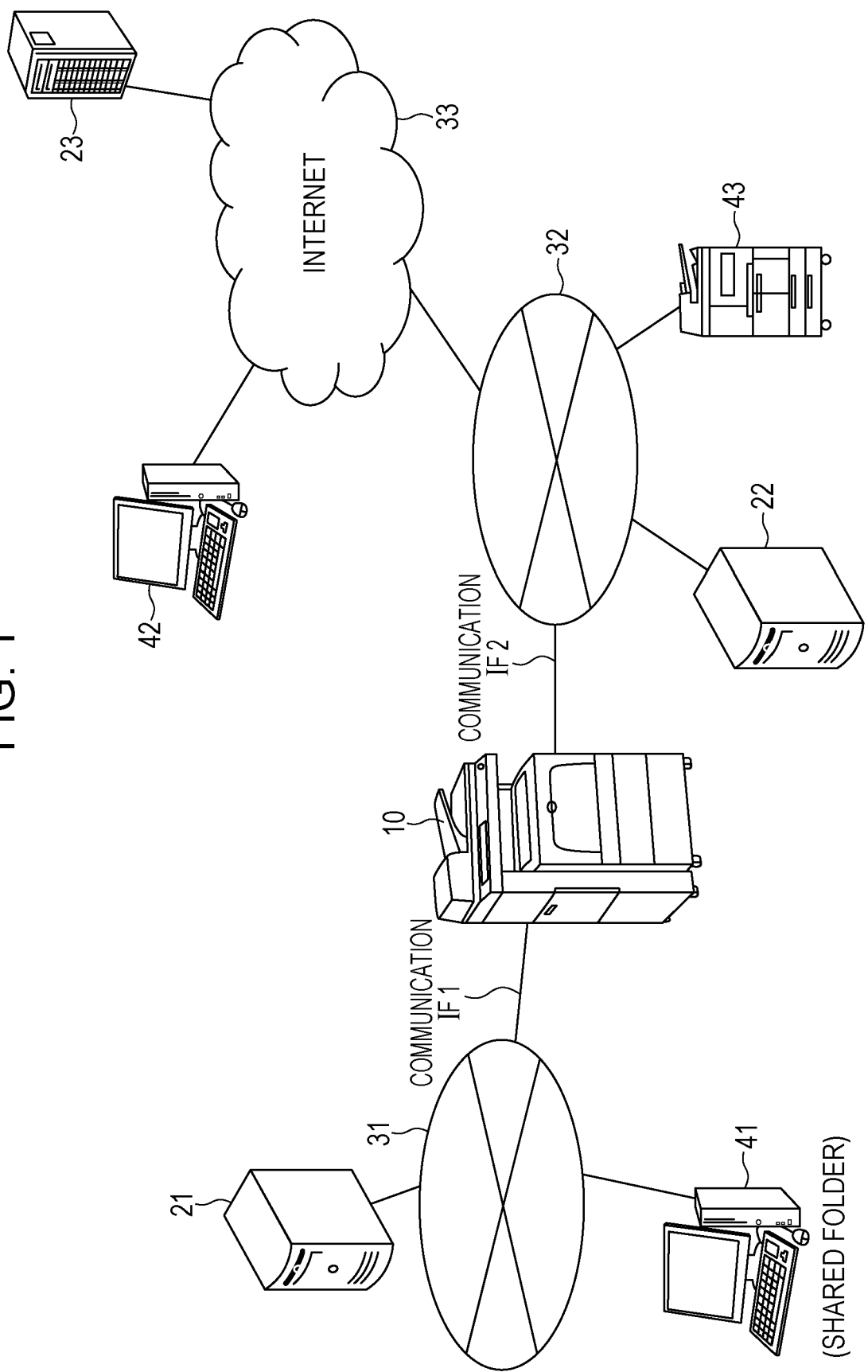
FIG. 1 is a diagram illustrating an example of a configuration of a system including an image forming apparatus according to an exemplary embodiment of the present invention.

FIG. 1 is a diagram illustrating an example of a configuration of a system including an image forming apparatus 10 according to an exemplary embodiment of the present invention.

The image forming apparatus 10 according to an exemplary embodiment of the present invention includes two communication interfaces (a communication IF (Interface) 1 and a communication IF 2), as illustrated in FIG. 1.

The communication IF 1 is connected to a network 31, and the communication IF 2 is connected to the network 32. Furthermore, a file transfer protocol (FTP) server 21 and a terminal apparatus 41 such as a personal computer (PC) are connected to the network 31.

The FTP server is a server that transmits and receives files by using an FTP as a communication protocol for file transfer. The terminal apparatus 41 is used to provide a shared folder in which data is stored in a manner shared by plural persons.

A mail server 22 and another image forming apparatus 43 different from the image forming apparatus 10 according to the present exemplary embodiment are connected to the network 32, and the network 32 is connected to an Internet 33 via a router (not illustrated). A terminal apparatus 42 and a mail server 23 are connected to the Internet 33.

With such a system configuration, the image forming apparatus 10 need use the communication IF 1 in a case where scanned image data is to be transferred from the image forming apparatus 10 to the FTP server 21 or the terminal apparatus 41. In a case where data is to be transferred from the image forming apparatus 10 to the image forming apparatus 43 or in a case where an e-mail is sent by using the mail server 22, the image forming apparatus 10 need use the communication IF 2.

Furthermore, the image forming apparatus 10 need use the communication IF 2 in a case where the image forming apparatus 10 is connected to the terminal apparatus 42 or the mail server 23 over the Internet 33.

The communication IF 1 and the communication IF 2 may be connected by a network cable or may be connected over a wireless local area network (LAN) such as Wi-Fi (Registered Trademark).

In the network configuration illustrated in FIG. 1, the network 31 is not connected to the Internet 33, and therefore the network 31 is configured so that information leaks are harder to occur, whereas the network 32 is connected to the Internet 33, and therefore the network 32 is configured so that information leaks are more likely to occur than the network 31.

By constructing the two networks 31 and 32 and separating the devices connected to the network 31 and the devices connected to the network 32 as illustrated in FIG. 1, the terminal apparatus 41 in which a shared folder is stored and the FTP server 21 cannot be accessed from an outside over the Internet 33.

The image forming apparatus 10 according to the present exemplary embodiment is an apparatus called a multi-function printer having plural functions such as a printing function, a scanning function, a copying function, and a facsimile function.

Figure 2:
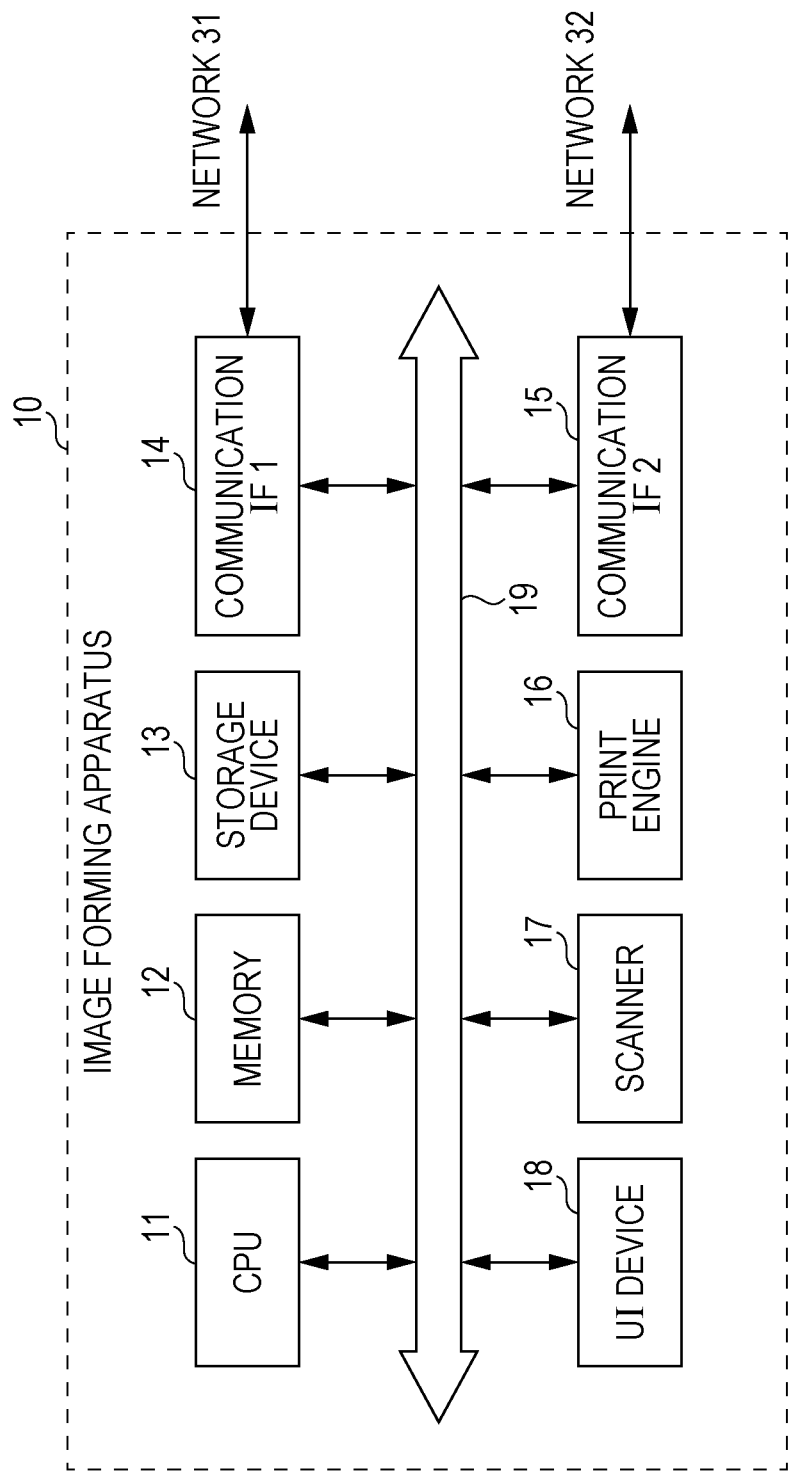
FIG. 2 is a block diagram illustrating a hardware configuration of the image forming apparatus according to the exemplary embodiment of the present invention.

Next, a hardware configuration of the image forming apparatus 10 in the image forming system according to the present exemplary embodiment is illustrated in FIG. 2.

As illustrated in FIG. 2, the image forming apparatus 10 includes a CPU 11, a memory 12, a storage device 13 such as a hard disk drive (HDD), communication interfaces (the communication IF 1 and the communication IF 2) 14 and 15, a print engine 16, a scanner 17, a user interface (UI) device 18 including a touch panel or a liquid crystal display and a keyboard. These constituent elements are connected to one another through a control bus 19.

The communication interface (communication IF 1) 14 is used to transmit data such as a scanned image, for example, to the FTP server 21 or the terminal apparatus 41 over the network 31. The communication interface (communication IF 2) 15 is used to transmit data such as a scanned image to the mail server 22 or the image forming apparatus 43 over the network 32 or to the terminal apparatus 42 or the mail server 23 via the Internet 33.

The print engine 16 prints an image on a recording medium such as a print sheet after processes such as charging, exposure, development, transfer, and fixation.

The CPU 11 controls an operation of the image forming apparatus 10 by performing predetermined processing on the basis of a control program stored in the memory 12 or the storage device 13. In the present exemplary embodiment, the CPU 11 executes a control program by reading the control program out from the memory 12 or the storage device 13. Alternatively, the program may be stored in a recording medium such as a CD-ROM and provided to the CPU 11.

Figure 3:
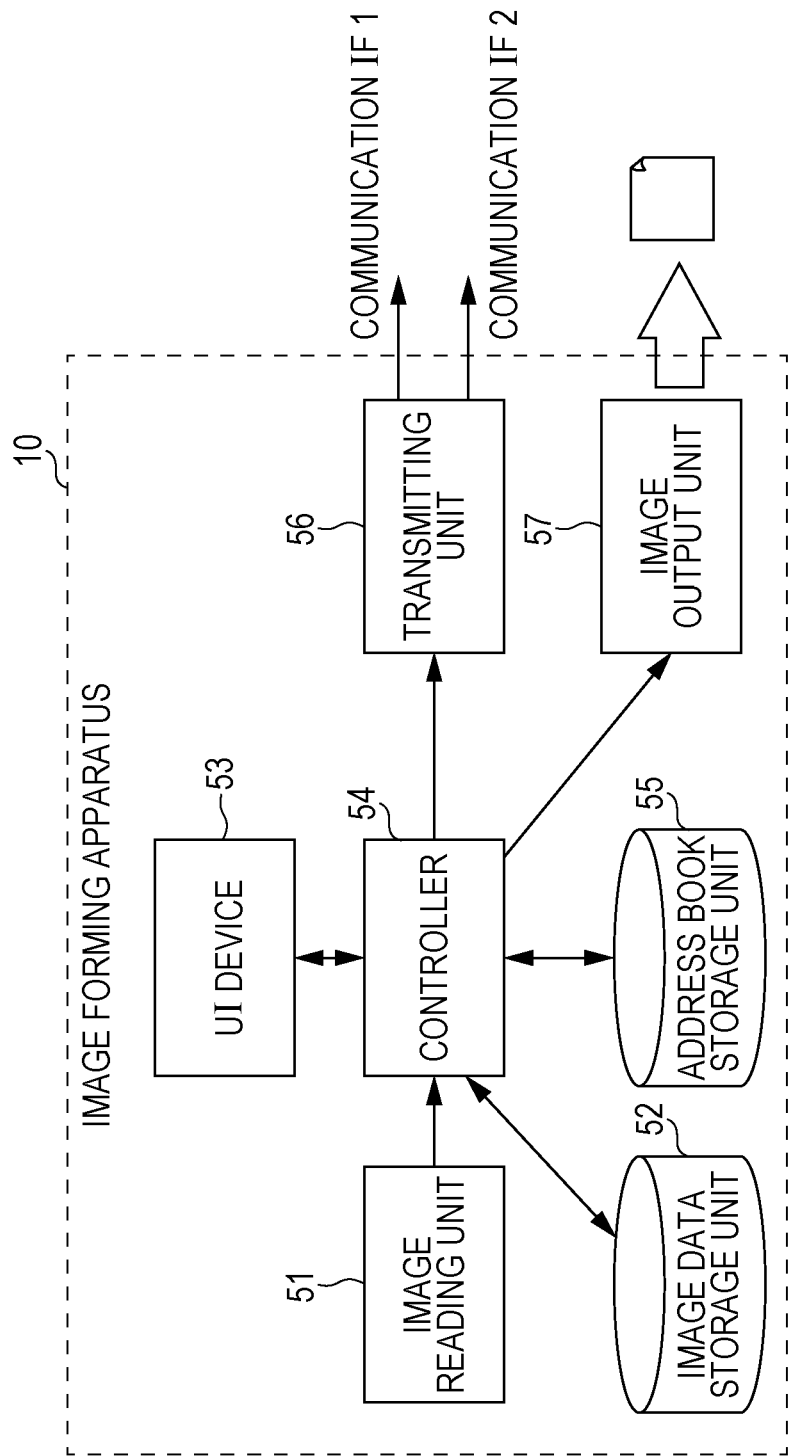
FIG. 3 is a block diagram illustrating a functional configuration of the image forming apparatus according to the exemplary embodiment of the present invention.

FIG. 3 is a block diagram illustrating a functional configuration of the image forming apparatus 10 realized by execution of the control program.

As illustrated in FIG. 3, the image forming apparatus 10 according to the present exemplary embodiment includes an image reading unit 51, an image data storage unit 52, a UI device 53, a controller 54, an address book storage unit 55, a transmitting unit 56, and an image output unit 57.

The image reading unit 51 reads an image from a placed document by scanning the document and thus generates scanned image data.

The image data storage unit 52 stores therein the image data read by the image reading unit 51 and image data to be printed.

The UI device 35 performs display processing for a user under control of the controller 54 and receives an instruction, setting, or the like from the user.

The address book storage unit 55 is a storage unit in which information such as an e-mail address to which read image data is to be transferred and a storage place of a folder is stored as destination information. In the address book storage unit 55, plural pieces of destination information are stored as an address book as illustrated in FIG. 4.

In the address book illustrated in FIG. 4, plural destinations such as an e-mail address, a shared folder, and an FTP server can be registered for each user. In this address book, a communication IF to be used can be registered for each destination. For example, as is clear from FIG. 4, in a case where image data is transferred to a shared folder "¥192.168.1.10¥share" registered for a user given a user name "AAA", the address book is set so that the "communication IF 1" is selected as a communication interface used for the transfer process.

The transmitting unit 56 is configured to be capable of transmitting data to a designated destination through two communication interfaces, i.e., the communication IF 1 and the communication IF 2.

The image output unit 57 outputs an image on a recording medium such as a print sheet on the basis of print data transferred from the controller 54.

The controller 54 performs control operations such as storing image data read by the image reading unit 51 in the image data storage unit 52 and controlling the image output unit 57 to output an image on a print sheet on the basis of a print instruction received from an external terminal apparatus or the like.

Furthermore, upon receipt of an instruction to transfer scanned image data to a designated destination (destination information) registered in the address book stored in the address book storage unit 55, the controller 54 controls the transmitting unit 56 to transfer the image data by using a communication interface registered for the destination.

In the address book, a communication interface to be used is not registered for each destination from the beginning, but instead the controller 54 determines, for each destination, a communication interface to be used for data transmission in advance and registers the communication interface to be used for data transmission in advance for each destination of the address book stored in the address book storage unit 55.

Registering in advance means not that a communication interface to be used is determined on the basis of a designated destination after designation of the destination by a user, but that a communication interface to be used is determined and registered before designation of the destination by a user.

Figure 5:
FIG. 5 is a diagram for explaining an example of determination patterns in which a controller determines a communication interface for each destination.

FIG. 5 illustrates an example of patterns in which the controller 54 determines a communication interface for each destination.

Determination Pattern 1

First, Determination Pattern 1 is described. In Determination Pattern 1, in a case where any of plural pieces of destination information in the address book stored in the address book storage unit 55 is changed, the controller 54 determines a communication interface for the changed destination information at a timing of the change of the destination information and registers the determined communication interface in the address book.

Not only in the case where destination information is changed but also in a case where new destination information is added to the address book, the controller 54 determines a communication interface for the added destination information and registers the determined communication interface in the address book.

In this process for determining a communication interface, the controller 54 omits connection confirmation processing by estimating a communication interface connectable to a target destination for which a communication interface is to be determined by using another piece of destination information for which a communication IF has been already registered and then registers the estimated communication interface, instead of promptly performing connection confirmation processing for determining whether or not the target destination is accessible through the communication IF 1 or the communication IF 2.

Specifically, in Determination Pattern 1, the controller 54 registers a communication interface registered for another piece of destination information as a communication interface for the target destination information in a case where an Internet protocol (IP) address or a domain name of the target destination information for which a communication interface is to be newly registered is the same as an IP address or a domain name of the other destination information for which a communication interface has been already registered.

In such a process for determining a communication interface by using another piece of destination information for which a communication interface has been already registered, the controller 54 determines whether or not the target destination is actually accessible by sequentially switching the communication IF 1 and the communication IF 2 in a case where a communication interface connectable to the target destination cannot be determined (estimated). In this case, the controller 54 performs the connection confirmation processing while keeping a value of Time to Live (TTL) in packet data for connection confirmation at 128, which is a default value (initial value).

This parameter TTL is a parameter that is decremented by 1 every time the packet data passes a single router. That is, the packet data does not reach a router in a range far from a value of TTL.

In Determination Pattern 1, the TTL value is kept large because the number of pieces of target destination information for which a communication interface is to be determined is not large in many cases and it can therefore be considered that burden on a communication network during connection confirmation is not large.

In a case where this connection confirmation processing is performed, the controller 54 sequentially determines whether or not target destination information for which a new communication interface is to be registered is accessible by using any of the two communication interfaces (the communication IF 1 and the communication IF 2) and registers, as a communication interface for the target destination information, a communication interface determined as a communication interface through which the target destination information is normally accessible.

Determination Pattern 2

Next, in a case where a high possibility of change of a communication network environment is detected, the controller 54 determines a communication interface again for destination information for which a communication interface having a high possibility of being changed is registered and then registers the determined communication interface again.

Specifically, the controller 54 detects a high possibility of change of a communication network environment in a case where a network address part (IP address band) of an IP address of destination information is changed.

An IP address is made up of a network address part for identifying a network and a host address part for identifying a host in the network. Therefore, when a network address part of an IP address of an image forming apparatus itself or an external device is changed, it can be determined that there is a high possibility that a communication network environment has been changed.

Specifically, in a case where an IP address "192.168.20.20" is registered as address information of the image forming apparatus itself or an external device and where this IP address is changed to "192.168.20.10", the controller 54 determines that a communication network environment has not been changed. This is because only a host address part has been changed, and a network address part has not been changed.

Meanwhile, in a case where an IP address "192.168.20.20" is registered as address information of the image forming apparatus itself or an external device and where this IP address is changed to "172.27.20.20", the controller 54 determines that there is a high possibility that the communication network environment has been changed. This is because not only the host address part, but also the network address part have been changed.

In a case where insertion or extraction of a communication cable is detectable, the controller 54 detects a high possibility of change of a communication network environment in a case where the communication cable has been inserted or extracted.

In Determination Pattern 2, the controller 54 determines a communication interface again for all pieces of destination information for which a communication interface that has undergone change of a communication network environment is registered.

In Determination Pattern 2, the controller 54 omits connection confirmation processing and registers a communication interface registered for another piece of destination information as a communication interface for the target destination information in a case where an IP address or a domain name of the target destination information is the same as an IP address or a domain name of the other piece of destination information for which a communication interface has been already registered, as in Determination Pattern 1.

In Determination Pattern 2, the controller 54 performs the connection confirmation processing while setting the number of hops in previous connection confirmation as a TTL value in packet data for connection confirmation instead of performing the connection confirmation processing while keeping a TTL value in packet data for connection confirmation at a default value of 128 in Determination Pattern 1.

Specifically, the controller 54 stores the number of hops (the number of passed routers) consumed during connection confirmation performed for target destination information. Then, the controller 54 performs connection confirmation for destination information for which a communication interface having a high possibility of change of a communication network environment is registered while setting the stored number of hops as a TTL value that is decremented every time a single router is passed.

In Determination Pattern 2, the number of pieces of target destination information is large in many cases, and therefore widening a connection confirmation range for all of the pieces of target destination information has a risk of increasing burden on the communication network. For this reason, in Determination Pattern 2, the connection range in the process for determining a communication interface is limited as described above.

Determination Pattern 3

The image forming apparatus 10 according to the present exemplary embodiment has various function offering units, such as the image output unit 57, that offer functions to a user.

In Determination Pattern 3, the controller 54 performs a process of determining and registering a communication interface to be used for destination information for which a communication interface to be used has not been registered in a case where a function is not offered to a user by such a function offering unit.

Examples of a case (timing) where a function is not offered to a user include a case where a mode has shifted to an energy-saving mode, a case where human movement detected around the apparatus by a human sensor has decreased, and a case where a volume of packet data of a communication network has become equal to or lower than a preset value.

Alternatively, the controller 54 may register, during a preset time zone, a communication interface to be used for data transmission for destination information for which a communication interface to be used has not been registered.

The preset time zone is, for example, a time zone designated by a user, and specific examples thereof include a time zone from 11 p.m. to 6 a.m. during which the image forming apparatus 10 is less likely to be used and a time zone from 12 p.m. to 13 p.m. that is a lunch hour. In Determination Pattern 3, the following processes are sequentially performed as a method for determining a communication interface without actual connection confirmation.

(1) Determining method referring to another piece of destination information having the same IP address or domain name (method similar to Determination Pattern 1 and 2).

(2) Determining method referring to another piece of destination information having an IP address including the same network address part In the method (2), the controller 54 registers a communication interface registered in another piece of destination information as a communication interface for target destination information for which a new communication interface is to be registered in a case where a network address part of an IP address of the target destination information is the same as a network address part of an IP address of the other destination information for which a communication interface has been already registered.

(3) Determining method referring to another piece of destination information of the same user In the method (3), the controller 54 registers a communication interface registered in another piece of destination information as a communication interface for target destination information for which a new communication interface is to be registered in a case where a user registered in the target destination information is the same as a user registered in the other destination information for which a communication interface has been already registered.

In Determination Pattern 3, in a case where a communication interface cannot be determined by the above methods, the controller 54 performs connection confirmation processing while setting a TTL value in packet data for connection confirmation at a default value of 128 as in Determination Pattern 1.

Next, the process in which the image forming apparatus 10 according to the present exemplary embodiment determines a communication interface to be registered in destination information of the address book is described in detail with reference to the drawings.

Figure 6:
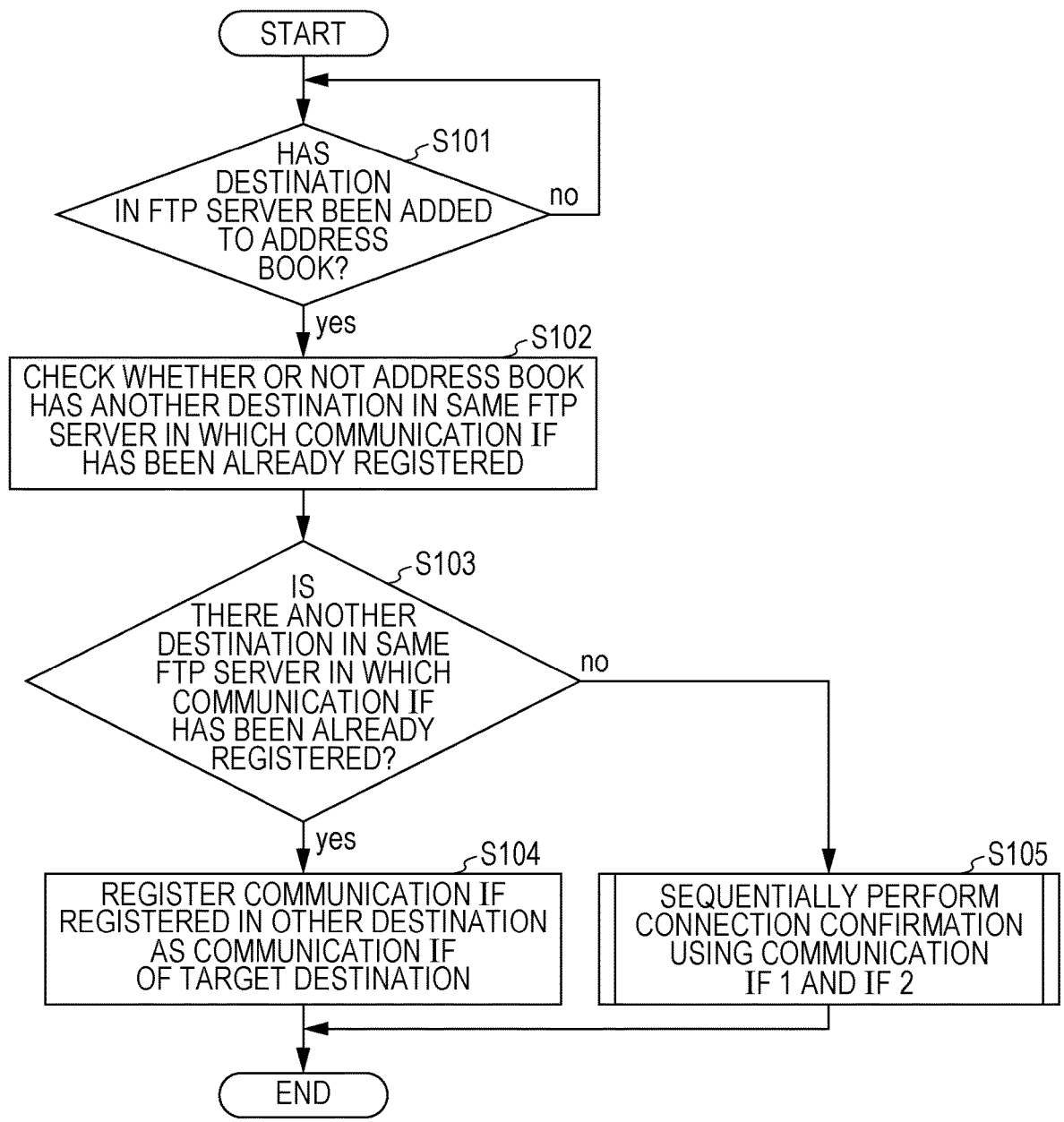
FIG. 6 is a flowchart for explaining an operation performed in a case where a destination in an FTP server has been added to the address book as an example of Determination Pattern 1.

First, an operation performed in a case where a destination in an FTP server is added to the address book is described as an example of Determination Pattern 1 described above with reference to the flowchart of FIG. 6.

For example, a case where "ftp://192.168.20.20./home/aaa/" that is a destination in an FTP server has been added as a destination 3 of a user AAA of the address book as illustrated in FIG. 7 is described.

In such a case where a destination in an FTP server is added to the address book (yes in Step S101), the controller 54 checks whether or not the address book has another destination in the same FTP server for which a communication interface has been already registered (Step S102).

In a case where the address book has another destination in the same FTP server for which a communication interface has been already registered (yes in Step S103), the controller 54 registers the communication interface registered in the other destination as a communication interface for the target destination (Step S104).

For example, in the example of the address book illustrated in FIG. 7, a destination "ftp://192.168.20.20/home/zzz/" has been registered as a destination 3 of a user ZZZ, and the communication IF 1 has been already registered in the destination 3 of the user ZZZ. Therefore, the controller 54 registers the communication IF 1 for "ftp://192.168.20.20/home/aaa/" that is the target destination by referring to the information of the communication IF 1 registered in the destination 3 of the user ZZZ.

In a case where the address book does not have another destination in the same FTP server for which a communication interface has been already registered (no in Step S103), the controller 54 determines through which of the communication interfaces the target destination is accessible by sequentially performing connection confirmation using the communication IF 1 and the communication IF 2 (Step S105).

Figure 8:
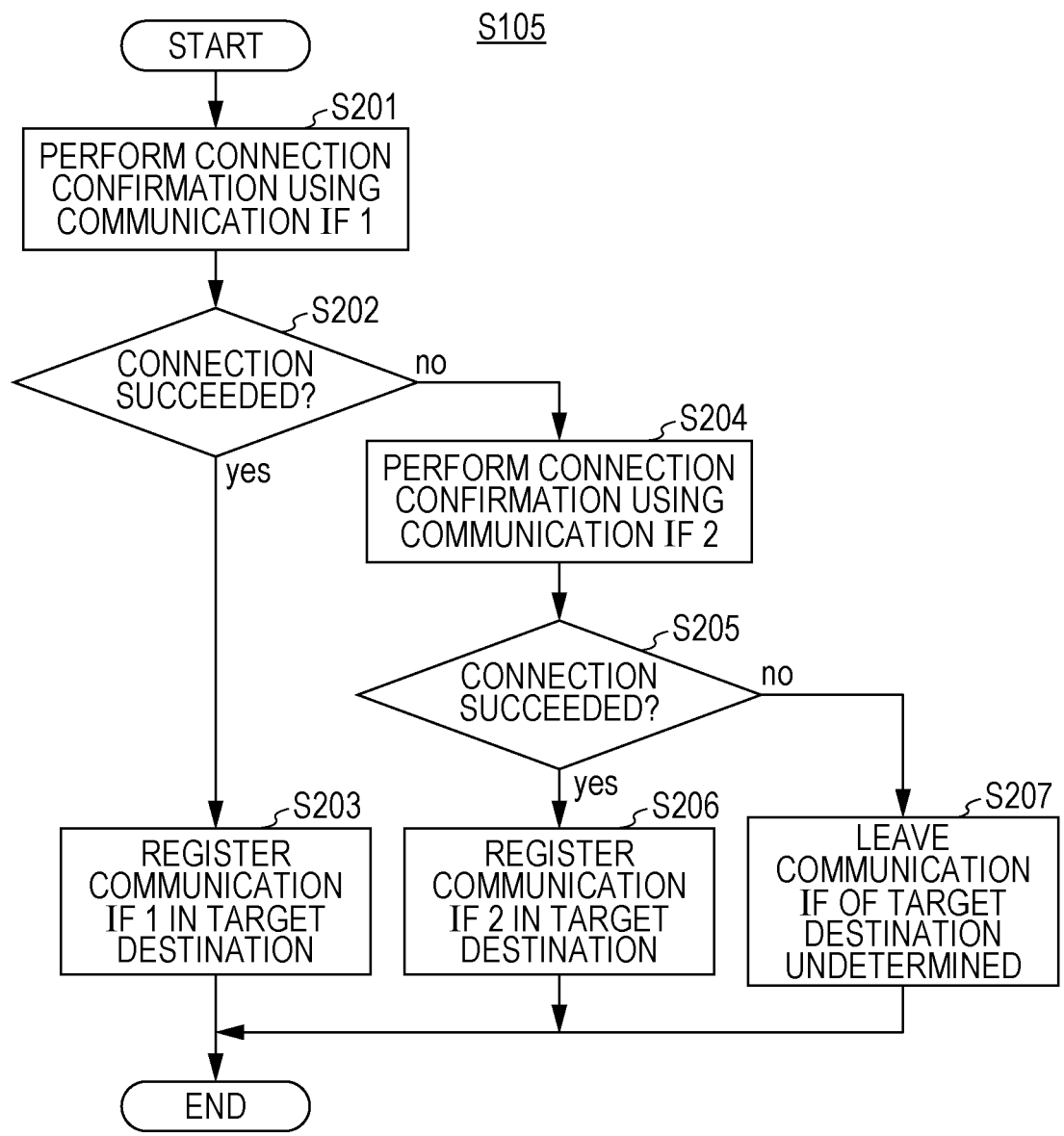
FIG. 8 is a flowchart for explaining details of an operation of sequentially performing connection confirmation using communication IFs.

Next, the operation of sequentially performing connection confirmation using the communication IF 1 and the communication IF 2 is described in detail with reference to the flowchart of FIG. 8.

In the confirmation processing involving actual connection to a destination, the controller 54 first performs connection confirmation processing for determining whether or not the target destination is accessible by using the communication IF 1 (Step S201).

In a case where connection using the communication IF 1 succeeds (yes in Step S202), the controller 54 registers the communication IF 1 in the target destination (Step S203).

In a case where connection using the communication IF 1 does not succeed (no in Step S202), the controller 54 performs connection confirmation processing for determining whether or not the target destination is accessible by using the communication IF 2 (Step S204).

In a case where connection using the communication IF 2 succeeds (yes in Step S205), the controller 54 registers the communication IF 2 in the target destination (Step S206).

In a case where connection using the communication IF 2 does not succeed (no in Step S205), the controller 54 finishes the processing while leaving the communication interface for the target destination undetermined (Step S207).

In such a case where the controller 54 fails to determine the communication interface for the target destination, the controller 54 may notify a user about the failure to determine the communication interface, for example, by using the UI device 53 or by sending an e-mail.

Figure 9:
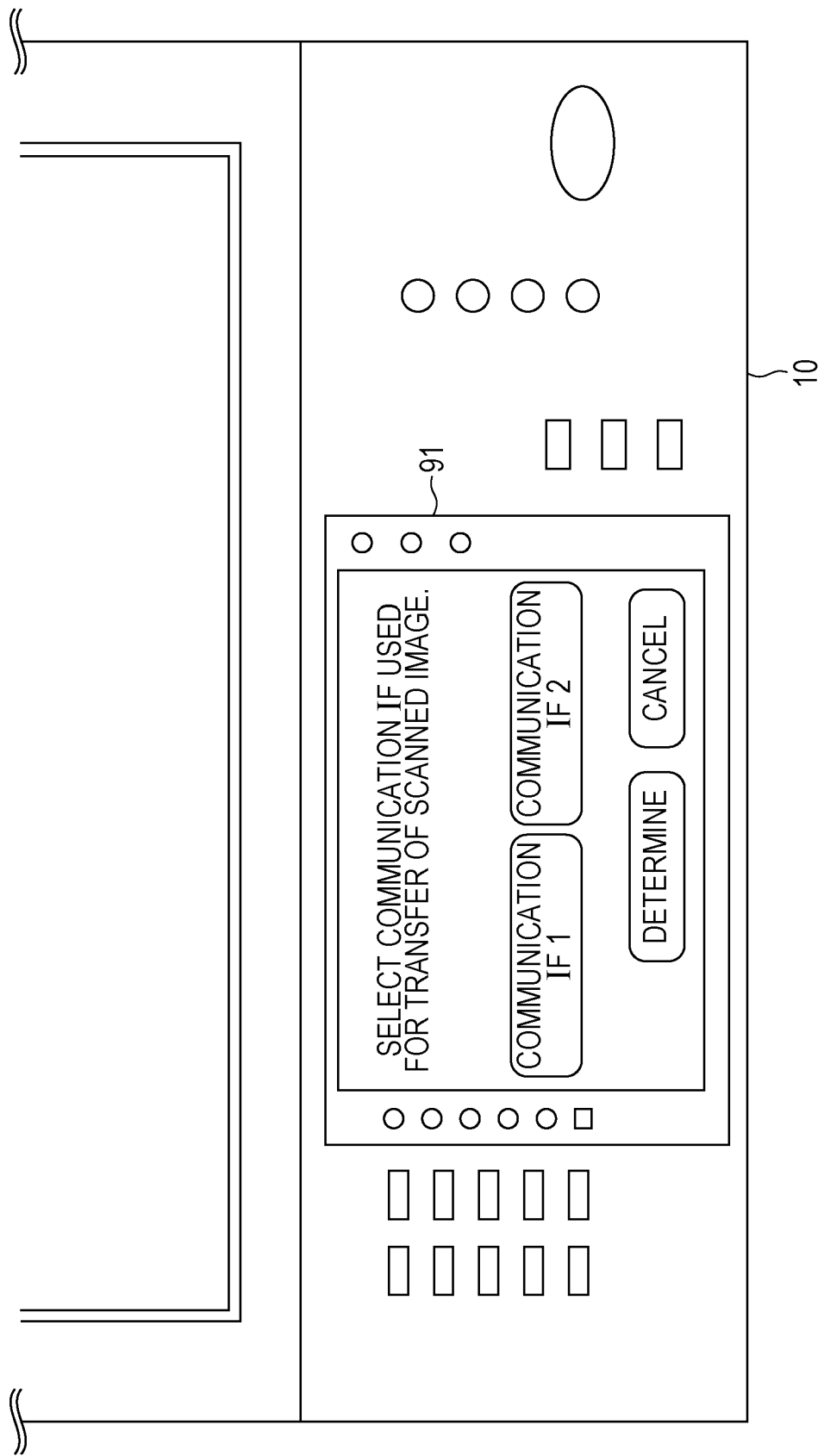
FIG. 9 illustrates a display example of an operation panel for prompting a user to select a communication interface used for transfer of a scanned image.

Furthermore, the user may be prompted to selects a communication interface to be used for transfer of a scanned image on an operation panel 91 of the image forming apparatus 10, as illustrated in FIG. 9.

Next, an operation performed in a case where a change of a communication network environment has been detected is described as an example of Determination Pattern 2 described above with reference to the flowchart of FIG. 10.

For example, in a case where an IP address of an external device is changed from "192.168.10.10/24" to "172.27.10.10/24", the controller 54 determines that there is a high possibility that a communication network environment has changed (Step S301).

Then, the controller 54 extracts all destinations for which a communication interface (e.g., the communication IF 1) that has undergone a communication network environment from the address book (Step S302).

Then, the controller 54 selects a single target destination from among the extracted destinations (Step S303) and checks whether or not there is another destination for which a communication interface has been already registered and that has the same IP address or domain name as the target destination (Step S304).

In a case where there is another destination for which a communication interface has been already registered and that has the same IP address or domain name (yes in Step S305), the controller 54 registers the communication interface registered in the other destination as a communication interface for the target destination (Step S306).

In a case where the address book does not have another destination for which a communication interface has been already registered and that has the same IP address or domain name (no in Step S305), the controller 54 determines through which of the communication interfaces the target destination is accessible by sequentially performing connection confirmation using the communication IF 1 and the communication IF 2 (Step S307). This process in Step S307 is similar to the process in Step S105 in the flowchart of FIG. 6, and description thereof is omitted.

Then, the processes in Steps S303 through S307 are repeated until the process for determining a communication interface is completed for all of the extracted destinations (Step S308).

Figure 11:
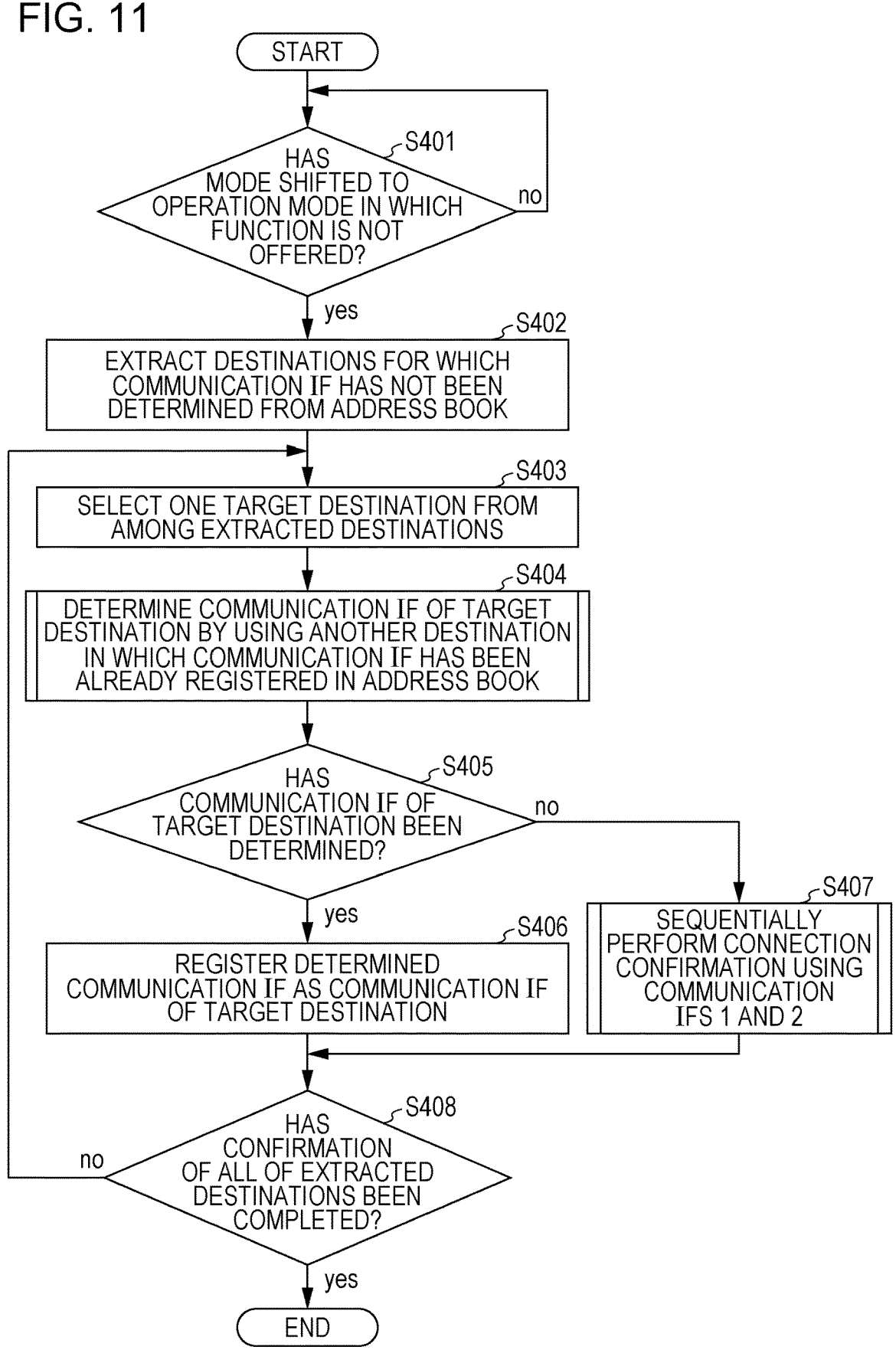
FIG. 11 is a flowchart for explaining an operation performed in a case where a timing where a function is not offered to a user has been detected as an example of Determination Pattern 3.

Next, an operation performed in a case where a timing where a function is not offered to a user has been detected is described as an example of Determination Pattern 3 described above with reference to the flowchart of FIG. 11.

For example, in a case where the image forming apparatus 10 has shifted to an energy-saving mode, the controller 54 determines that the image forming apparatus 10 has shifted to an operation mode in which a function is not offered to a user (Step S401).

Then, the controller 54 extracts all destinations for which a communication interface has not been determined from the address book (Step S402).

Then, the controller 54 selects a single target destination from among the extracted destinations (Step S403) and performs the process for determining a communication interface for the target destination by using another destination for which a communication interface has been already registered in the address book (Step S404).

The determining process using another destination for which a communication interface has been registered in Step S404 is described in detail with reference to the flowchart of FIG. 12.

First, the controller 54 checks whether or not the address book has another destination for which a communication interface has been already registered and that has the same IP address or domain name as the target destination. In a case where the address book has another destination for which a communication interface has been already registered and that has the same IP address or domain name, the controller 54 determines the communication interface registered in the other destination as a communication interface for the target destination (Step S501).

Figure 10:
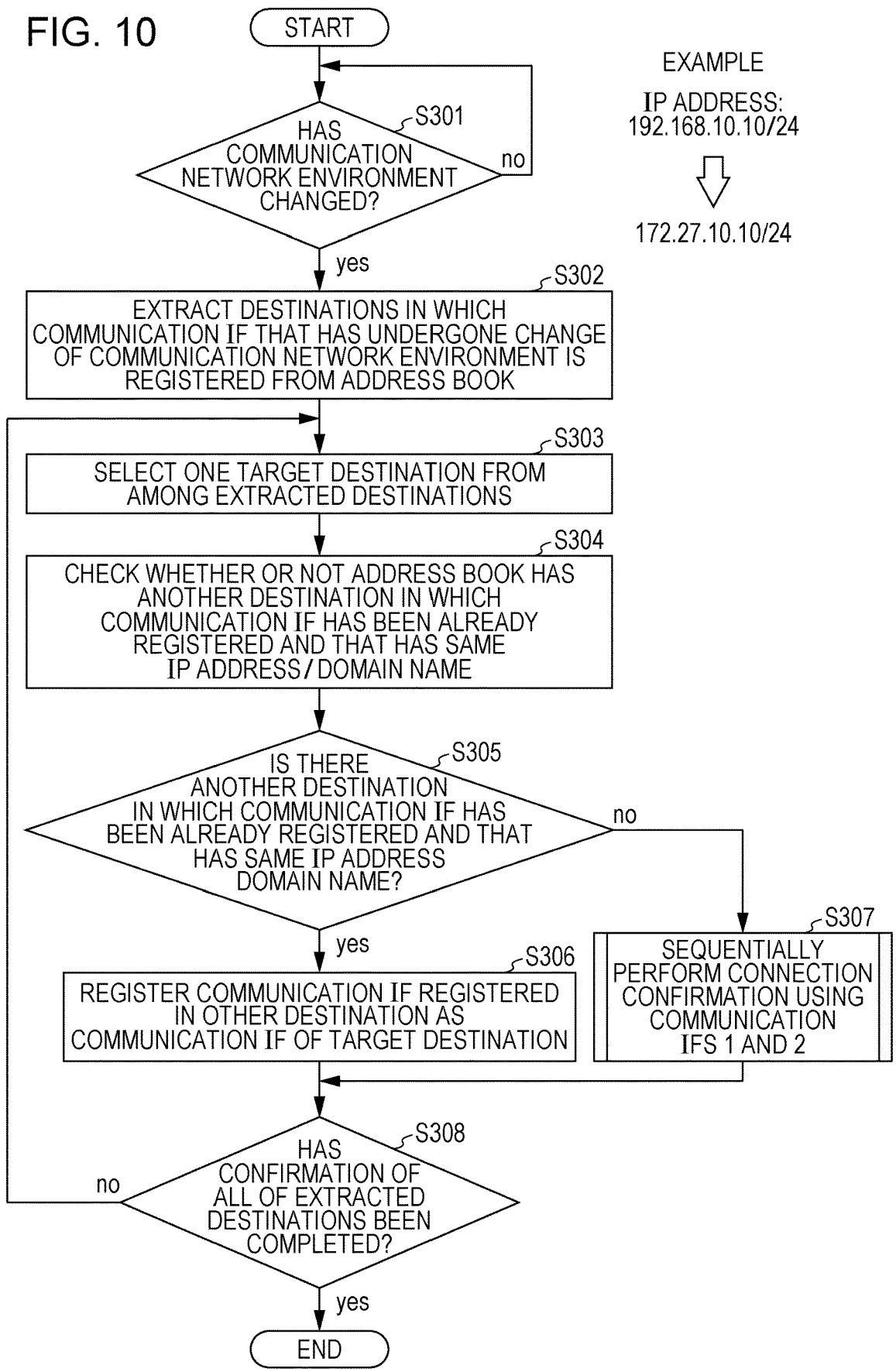
FIG. 10 is a flowchart for explaining an operation performed in a case where a change of a communication network environment has been detected as an example of Determination Pattern 2.

The determining process in Step S501 is similar to the process in Step S304 in the flowchart of FIG. 10.

Next, the controller 54 checks whether or not the address book has another destination for which a communication interface has been already registered and that has an IP address including a network address part same as an IP address of the target destination. In a case where the address book has another destination for which a communication interface has been already registered and that has an IP address including the same network address part, the controller 54 determines the communication interface registered in the other destination as a communication interface for the target destination (Step S502).

Figure 13:
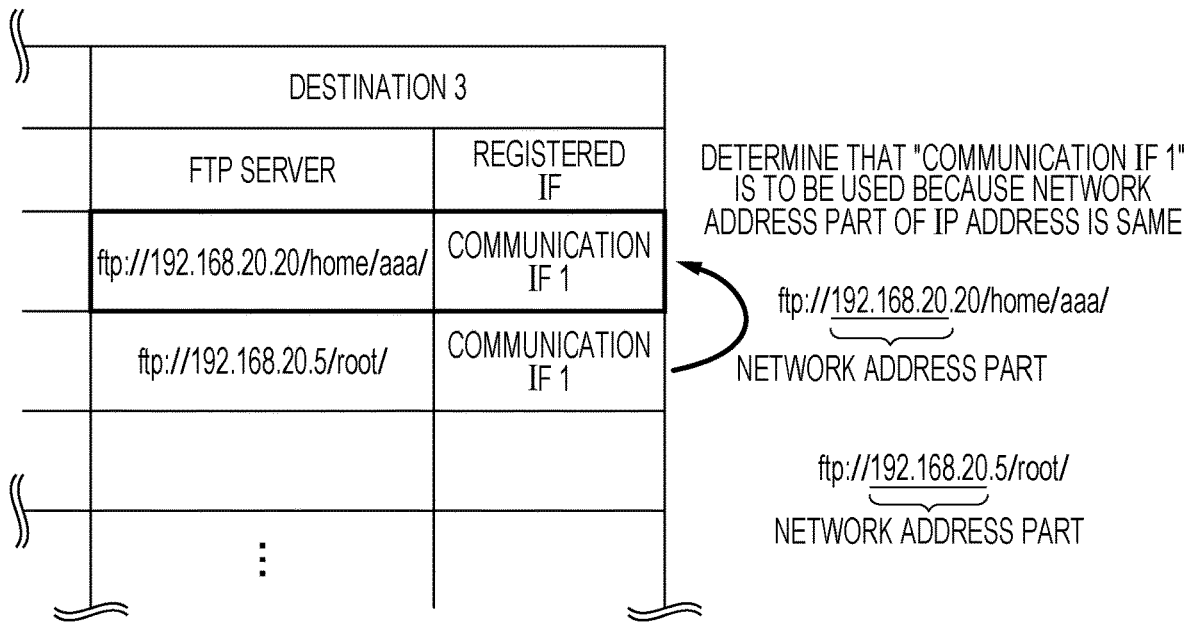
FIG. 13 illustrates an example of an address book for explaining an example of a determining process using another destination for which a communication IF has been registered.

For example, as illustrated in FIG. 13, in a case where the target destination has an IP address "ftp://192.168.20.20", where a destination having an IP address "ftp://192.168.20.5" has been registered in the address book, and where the communication IF 1 has been registered in this destination, the communication IF 1 is also determined as the communication interface to be used for the target destination.

Furthermore, the controller 54 checks whether or not the address book has another destination for which a communication interface has been already registered and for which the same user as the target destination has been registered. In a case where the address book has another destination for which a communication interface has been already registered and for which the same user has been registered, the controller 54 determines the communication interface registered in the other destination as a communication interface for the target destination (Step S503).

For example, as illustrated in FIG. 14, in a case where an e-mail address "ccc@abcdefg.co.jp" is added to a user CCC, a destination "¥¥testserver.local¥doc" has been already registered as a destination 2 for the user CCC, and the communication IF 2 has been registered in the destination 2, the controller 54 also determines that the communication IF 2 is a communication interface to be registered for the added e-mail address "ccc@abcdefg.co.jp".

Figure 12:
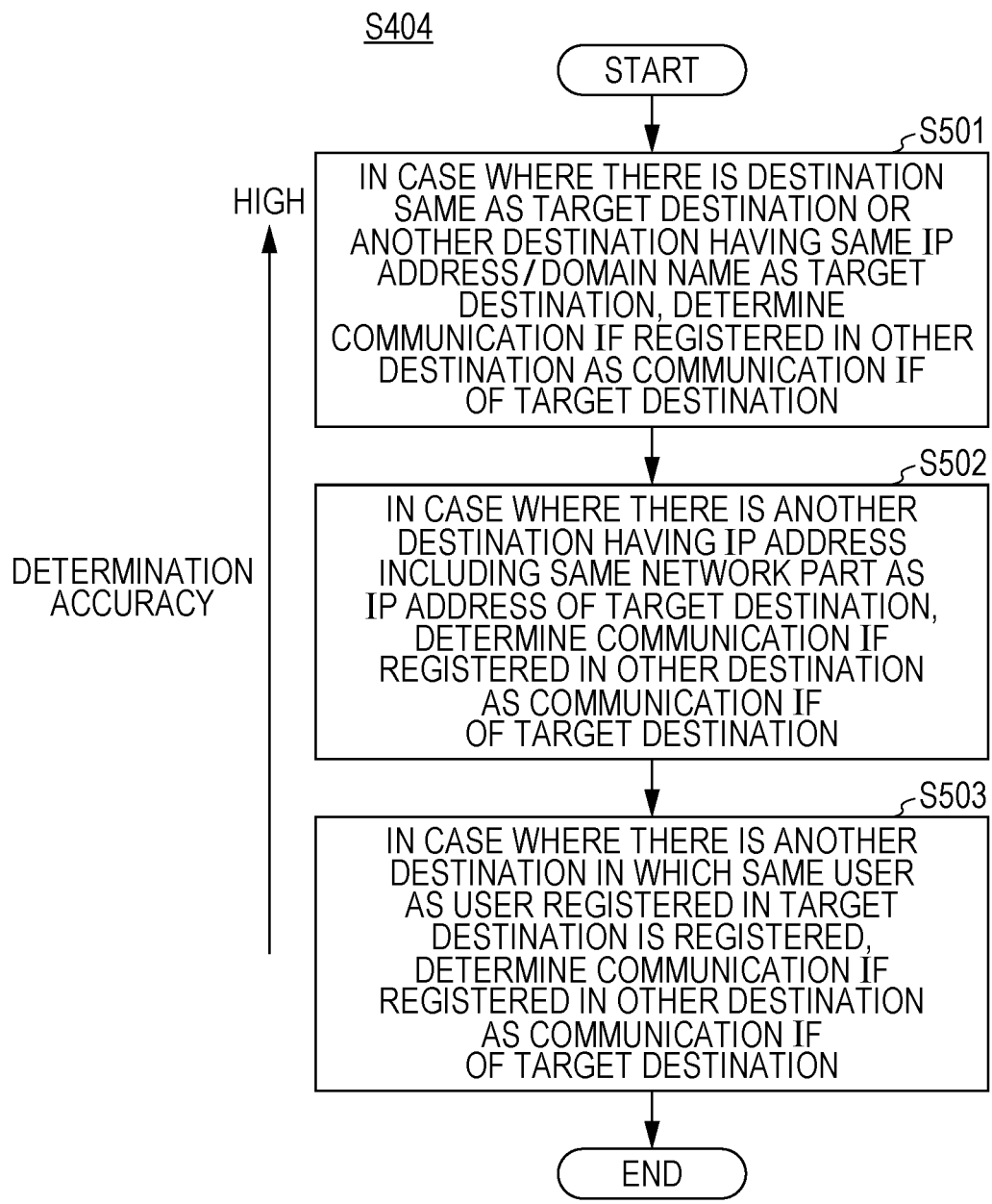
FIG. 12 is a flowchart for explaining details of a determining process in a step using another destination for which a communication interface has been registered.

As illustrated in FIG. 12, the determining process in S502 can determine a communication interface with higher accuracy than the determining process in S503, and the determining process in S501 can determine a communication interface with higher accuracy than the determining process in S502.

Therefore, in a case where the communication interface can be determined by the determining process in S501, the determining processes in Steps S502 and S503 are skipped, and in a case where the communication interface can be determined by the determining process in S502, the determining process in S503 is skipped.

See the flowchart of FIG. 11 again. In a case where the communication interface can be determined by the determining process in S404 (Step S405), the controller 54 registers the determined communication interface as the communication interface for the target destination (Step S406).

In a case where the communication interface of the target destination cannot be determined (no in Step S405), the controller 54 determines through which of the communication interfaces the target destination is accessible by sequentially performing connection confirmation using the communication IF 1 and the communication IF 2 (Step S407). The process in Step S407 is similar to the process in Step S105 in the flowchart illustrated in FIG. 6, and therefore description thereof is omitted.

The processes in Steps S403 through S407 are repeated until the process for determining a communication interface has been completed for all of the extracted destinations (Step S408).

In the present exemplary embodiment, a case where scanned image data is transferred by selecting one of the two communication interfaces (the communication IF 1 and the communication IF 2) has been described. However, the present invention is also applicable to a case where scanned image data is transferred by selecting one communication interface from three or more communication interfaces.

MODIFICATION

In the above exemplary embodiment, a case where the present invention is applied to an image forming apparatus has been described. The present invention is not limited to this, and the present invention is applicable to any communication apparatuses that transmit data to a designated destination.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A communication apparatus comprising:
   a plurality of communication interfaces,
   a storage unit in which a plurality of pieces of destination information are stored;
   a processor configured to perform the following:
      transmit data to a designated destination through a selected one of the plurality of communication interfaces;
      register a communication interface used for data transmission in advance for each of the plurality of pieces of destination information stored in the storage unit; and
      determine that a high possibility of a change of a communication network environment when an IP address of the communication apparatus or an external device is changed, or a communication cable is inserted or extracted; and
      as a result of determining that a high possibility of a change of the communication network environment has occurred, determine without user input, the communication interface again for all pieces of destination information for which a communication interface that has undergone change of a communication network environment is registered.

2. The communication apparatus of claim 1, wherein the IP address that is changed is a host address or a network address.

3. A non-transitory computer readable medium storing a program causing a computer to execute a process, the process comprising:
   transmit data to a designated destination through a plurality of communication interfaces;
   store a plurality of pieces of destination information in a storage unit;
   register a communication interface used for data transmission in advance for each of the plurality of pieces of destination information stored in the storage unit;
   detect, in a case where an IP address of a communication apparatus or an external device is changed, or a communication cable is inserted or extracted, the high possibility of the change of the communication network environment, and
   as a result of determining that a high possibility of a change of the communication network environment has occurred, determine without user input, the communication interface again for all pieces of destination information for which a communication interface that has undergone change of a communication network environment is registered.

* * * * *